(No Model.)
G. H. S. O. MÖLLER.
THERMOMETER.
No. 497,925. Patented May 23, 1893.
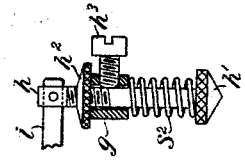
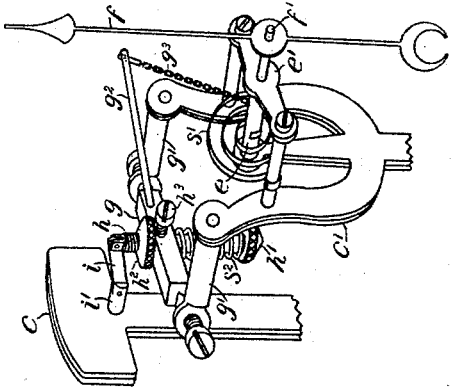
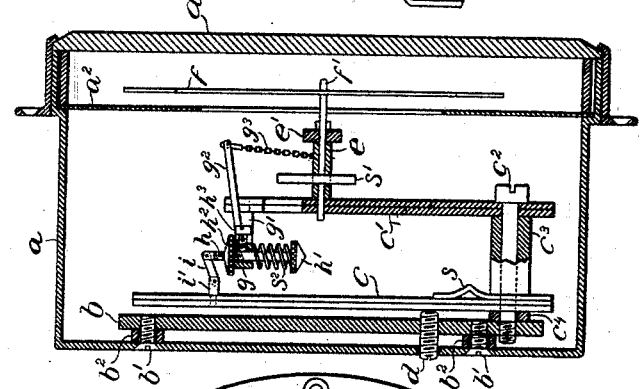
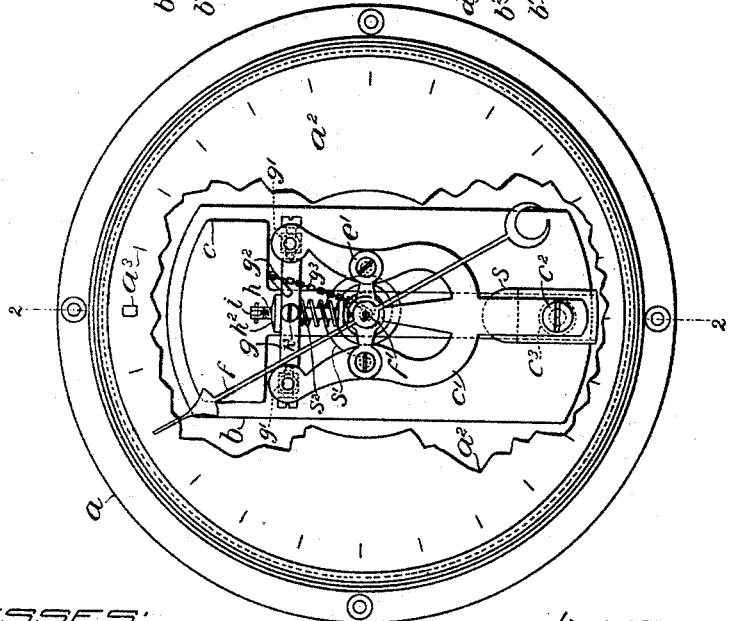
WITNESSES:
W. A. Schaefer
W. Jackson
INVENTOR:
Georg H. S. O. Möller,
By J. Walter Douglass.
ATT'Y.

UNITED STATES PATENT OFFICE.

GEORG HENRY SIEGMUND OSCAR MÖLLER, OF HAMBURG, GERMANY.

THERMOMETER.

SPECIFICATION forming part of Letters Patent No. 497,925, dated May 23, 1893.

Application filed March 29, 1892. Serial No. 426,988. (No model.) Patented in Germany May 1, 1891, No. 59,764; in France September 12, 1891, No. 213,561; in England February 4, 1892, No. 2,179; in Belgium February 8, 1892, No. 98,262, and in Canada February 27, 1892, No. 38,924.

*To all whom it may concern:*

Be it known that I, GEORG HENRY SIEGMUND OSCAR MÖLLER, a subject of the Emperor of Germany, and a resident of Hamburg, in the German Empire, have invented certain new and useful Improvements in Metallic Thermometers, (for which I have obtained Canadian Letters Patent No. 38,924, of February 27, 1892; English Letters Patent No. 2,179, of February 4, 1892; Belgian Letters Patent No. 98,262, of February 8, 1892; German Letters Patent No. 59,764, of May 1, 1891, and French Letters Patent No. 213,561, of September 12, 1891,) of which improvements the following is a specification.

The principal objects of my invention are first, to provide a simple, reliable, efficient and comparatively inexpensive metallic thermometer; and second, to provide such a thermometer with compact and durable means, whereby the relative travel of the index and positions of the composite plates may be easily and accurately adjusted and otherwise regulated.

My invention consists of a metallic thermometer provided with composite metallic plates or bars adapted to converge and diverge as the temperature changes, a rock-shaft carried by one of the composite plates and provided with two arms, whereof one is connected with the other composite plate and whereof the other is adapted to actuate an index or pointer against the force of a spring.

My invention further consists of a metallic thermometer provided with composite metallic plates or bars adapted to converge and diverge as the temperature changes, a rock-shaft carried by one of the composite plates and provided with an arm adapted to actuate an index or pointer against the force of a spring and with a longitudinally adjustable arm connected with the other composite plate, whereby the travel of the index or pointer may be regulated in respect to the movement of the plates.

My invention further consists of a metallic thermometer provided with composite metallic plates or bars adapted to converge and diverge as the temperature changes, a spring and a set-screw for adjustably supporting one of said plates or bars, and mechanism operated by the movement of the composite plates or bars and adapted to actuate an index or pointer against the force of a spring; and My invention further consists of the improvements in metallic thermometers hereinafter described and claimed.

The nature, characteristic features and scope of my invention will be more fully understood from the following description taken in connection with the accompanying drawings forming part hereof; and in which—

Figure 1, is a front view of a metallic thermometer embodying features of my invention, and showing portions of the dial-plate broken away. Fig. 2, is a central sectional view taken on the line 2—2, of Fig. 1. Fig. 3, is a detached perspective view illustrating the mechanism and rock-shaft interposed between the composite-plates or bars and the index or pointer; and Fig. 4, is a detail view of the adjustable arm of the rock-shaft.

$a$, is an exterior case or housing provided with a glass plate $a'$, through which the dial-plate $a^2$, and scale $a^3$, provided with empirical graduations are visible.

$b$, is a base or supporting plate rigidly attached to the rear wall of the case or housing $a$, by means of screws $b'$, and sleeves $b^2$.

$c$ and $c'$, are composite thermostatic plates or bars adapted to converge and diverge at their upper extremities as the temperature changes. In the present instance the upper portions of these plates or bars converge when the temperature rises and diverge when the temperature falls. The lower portions of these plates or bars are attached to the base or supporting plate $b$, by means of a screw $c^2$, and are separated from the base or supporting plate and from each other by means of distance pieces $c^3$ and $c^4$.

$d$, is a set-screw accessible from the exterior of the housing or case and working through a tapped opening in the base or supporting plate $b$, in such manner that it affords means for adjusting the composite plate or bar $c$, against the force of a leaf spring $s$, and for a purpose to be presently described.

$e$, is a revoluble drum having one extremity thereof mounted in bearings in the plate or bar $c'$, and having the other extremity thereof similarly mounted in a yoke $e'$, attached to the plate or bar $c'$.

$f$, is an index or pointer rigidly connected with the drum $e$, by means of a spindle $f'$.

$s'$, is a coiled spring having one extremity thereof attached to the drum $e$, and having the other extremity thereof attached to one of the arms of the yoke $e'$, Fig. 3.

$g$, is a rock-shaft journaled to arms $g'$, projecting rearwardly from the bar or plate $c'$, and provided with an arm $g^2$, connected with the drum $e$, by means of a chain $g^3$.

$h$, is an arm fitted in and extending through a seat or opening cut or otherwise formed transversely of the rock-shaft $g$.

$s^2$, is a spring interposed between the head $h'$, of the arm $h$, and the under side of the rock-shaft $g$, and tending to shift the arm $h$, downward through its seat or opening.

$h^2$, is a screw cap resting upon the rock-shaft $g$, and engaging a thread cut or otherwise formed upon the arm $h$, so that the revolution of the screw-cap $h^2$, causes the arm $h$, to be shifted transversely of the rock-shaft and against the force of the spring $s^2$, for purposes to be presently described.

$h^3$, is a set-screw for clamping the arm $h$, to place in respect to the shaft $g$.

$i$, is a link pivotally connected with the upper extremity of the arm $h$, and with a clip $i'$, secured to the composite plate or bar $c$, and located at or near the top thereof.

The mode of operation of the hereinabove described metallic thermometer is as follows:—When the temperature rises the upper portions of the composite thermostatic plates or bars $c$ and $c'$, converge. During this operation the plate $c$, acting through the instrumentality of the link $i$, shifts the arm $h$, toward the right, and the plate $c'$, shifts the axis of the rock-shaft $g$, toward the left, thus causing the rock-shaft to be rotated slightly toward the right, with the result that the arm $g^2$, is turned downward. This motion of the arm $g^2$, causes the chain $g^3$, to be slackened, whereupon the spiral spring $s'$, turns the pointer or index $f$, toward the right in Fig. 1, into position for indicating the temperature upon the scale $a^3$. When the temperature falls the composite bars or plates $c$ and $c'$, diverge with the result that the rock-shaft $g$, is slightly rotated in a reverse direction, i. e. toward the left, so that the arm $g^2$, is shifted upward, thus causing the chain $g^3$, to slightly rotate the drum $e$, and pointer or index $f$, against the force of the coiled spring $s'$.

It is obviously important that means should be provided for regulating and adjusting the range of travel of the pointer or index $f$, corresponding to a given divergence or convergence of the plates or bars. In my invention this result may be accomplished by adjusting the relative positions of the plates or bars $c$ and $c'$, by means of the set-screw $d$, and leaf spring $s$, or by shifting the end of the arm $h$, to which the link $i$, is attached toward or away from the axis of the rock-shaft $g$, by means of the screw-cap $h^2$, and set-screw $h^3$, and in the manner hereinabove explained or by adjusting both the plates and arm. In either case the throw of the arm $g^2$, and consequently the movement of the index or pointer is correspondingly increased or diminished.

It will be obvious to those skilled in the art to which my invention appertains, that modifications may be made in details without departing from the spirit of my invention, hence I do not limit myself to the precise construction and arrangement of parts hereinabove set forth and illustrated in the accompanying drawings; but

Having thus described the nature and objects of my invention, what I claim as new, and desire to secure by Letters Patent, is—

1. A metallic thermometer provided with composite plates adapted to converge and diverge as the temperature changes, a spring controlled index or pointer, a shaft carried by one of said composite plates or bars and provided with an arm adapted to actuate said index or pointer against the force of the spring thereof, and an adjustable arm connected with the other of said composite plates or bars, substantially as and for the purposes set forth.

2. A metallic thermometer provided with composite metallic plates or bars adapted to converge and diverge as the temperature changes, a rock-shaft provided with an arm connected with one of the composite plates or bars by means of a link and carried by one side of the other composite plate or bar, a spring controlled drum carried by the other side of the last mentioned plate or bar, and an arm radiating from the rock-shaft and connected with the drum by a chain, substantially as and for the purposes set forth.

3. A metallic thermometer provided with composite metallic plates or bars adapted to converge and diverge as the temperature changes, a rock-shaft carried by one of the composite plates or bars and provided with an arm adapted to actuate an index or pointer and with a longitudinally adjustable arm connected with the other composite plate, substantially as and for the purposes set forth.

4. A metallic thermometer provided with composite metallic plates or bars adapted to converge and diverge as the temperature changes, a rock-shaft carried by one of the composite plates or bars and provided with an arm adapted to actuate an index or pointer and with a transversely ranging opening, an adjustable arm working in said opening and connected with the other composite bar or plate, and a spring and screw-cap for shifting the adjustable arm in respect to the axis of the rock-shaft, substantially as and for the purposes set forth.

5. A metallic thermometer provided with composite metallic plates or bars adapted to converge and diverge as the temperature changes, a rock-shaft carried by one of the composite plates or bars and provided with an arm adapted to actuate an index or pointer and with a transversely ranging opening, an adjustable arm working in said opening and connected with the other composite bar or plate, a spring and a screw-cap for shifting the adjustable arm in respect to the axis of the rock-shaft, and a set-screw for clamping said adjustable arm to place, substantially as and for the purposes set forth.

6. A metallic thermometer provided with composite metallic plates or bars adapted to converge and diverge as the temperature changes, a spring and a set-screw for adjustably supporting one of said plates or bars, and mechanism operated by the movement of the plates or bars and adapted to actuate an index or pointer against the force of a spring, substantially as and for the purposes set forth.

7. A metallic thermometer provided with composite metallic plates or bars adapted to converge and diverge as the temperature changes, a spring and a set-screw for adjustably supporting one of said plates or bars, a rock-shaft carried by the non-adjustable plate or bar and provided with an arm connected to the adjustable plate or bar and with an arm adapted to actuate a pointer or index carried by the non-adjustable plate or bar, substantially as and for the purposes set forth.

8. A metallic thermometer provided with composite metallic plates or bars adapted to converge and diverge as the temperature changes and secured to a base or supporting plate carried by the case or housing, a spring and a set-screw for adjustably supporting one of said plates or bars, a rock-shaft carried by the non-adjustable composite plate or bar and provided with an arm connected to the adjustable composite plate or bar and with an arm adapted to actuate a pointer or index carried by the non-adjustable composite plate or bar, substantially as and for the purposes set forth.

9. A metallic thermometer provided with composite metallic plates or bars adapted to converge and diverge as the temperature changes and secured to a base or supporting plate carried by the case or housing, a spring and a set-screw for adjustably supporting one of said plates or bars, and a rock-shaft carried by the non-adjustable composite plate or bar and provided with an arm connected to the adjustable composite plate or bar and with an arm adapted to actuate a spring controlled pointer or index and drum carried by the non-adjustable composite plate or bar through the instrumentality of a chain, substantially as and for the purposes set forth.

10. A metallic thermometer provided with composite thermostatic metallic plates or bars secured to a base or supporting plate carried by the case or housing, a spring and a set-screw for adjustably supporting one of said plates or bars, and a rock-shaft carried by the non-adjustable composite plate or bar and provided with an arm connected with the adjustable composite plate or bar and with an adjustable arm adapted to actuate a chain connected with a spring controlled pointer or index and drum carried by the non-adjustable composite plate or bar, substantially as and for the purposes set forth.

In witness whereof I have hereunto signed my name in the presence of two subscribing witnesses.

GEORG HENRY SIEGMUND OSCAR MÖLLER.

Witnesses:
M. BAUCH,
GUSTAV A. BEEKER,
*Insurance Brokers at Hamburg, I Brandstwich 3.*